United States Patent [19]
Mattar et al.

[11] Patent Number: 5,546,814
[45] Date of Patent: Aug. 20, 1996

[54] PARALLEL-FLOW CORIOLIS-TYPE MASS FLOWMETER WITH FLOW-DIVIDING MANIFOLD

[75] Inventors: Wade M. Mattar, Wrentham; Norman G. Hildreth, Milford, both of Mass.

[73] Assignee: The Foxboro Company, Foxboro, Mass.

[21] Appl. No.: 329,957

[22] Filed: Oct. 26, 1994

[51] Int. Cl.$^6$ .................................................. G01F 1/84
[52] U.S. Cl. .................................... 73/861.355; 285/132
[58] Field of Search ......................... 73/861.37, 861.38; 285/132, 179

[56] References Cited

U.S. PATENT DOCUMENTS

| | | |
|---|---|---|
| Re. 31,450 | 11/1983 | Smith . |
| 2,624,198 | 1/1953 | Pearson . |
| 2,811,854 | 11/1957 | Powers . |
| 2,813,423 | 11/1957 | Altfillisch et al. . |
| 2,819,437 | 1/1958 | White . |
| 2,821,084 | 1/1958 | Altfillisch et al. . |
| 2,831,349 | 4/1958 | Altfillisch et al. . |
| 2,834,209 | 5/1958 | Jones et al. . |
| 2,865,201 | 12/1958 | Roth . |
| 3,087,325 | 4/1963 | Roth . |
| 3,108,475 | 10/1963 | Henderson . |
| 3,132,512 | 5/1964 | Roth . |
| 3,218,851 | 11/1965 | Sipin . |
| 3,261,205 | 7/1966 | Sipin . |
| 3,276,257 | 10/1966 | Roth . |
| 3,329,019 | 7/1967 | Sipin . |
| 3,339,400 | 9/1967 | Banks . |
| 3,350,936 | 11/1967 | Li . |
| 3,355,944 | 12/1967 | Sipin . |
| 3,376,897 | 4/1968 | Dolder et al. . |
| 3,396,579 | 8/1968 | Souriau . |
| 3,456,491 | 7/1969 | Brockhaus . |
| 3,485,098 | 12/1969 | Sipin . |
| 3,509,767 | 5/1970 | Greer . |
| 3,794,056 | 2/1974 | Warren . |
| 3,896,619 | 7/1975 | Hunter et al. . |
| 3,927,565 | 12/1975 | Palvin et al. . |
| 4,109,524 | 8/1978 | Smith . |

(List continued on next page.)

FOREIGN PATENT DOCUMENTS

| | | |
|---|---|---|
| 0037654 | 10/1981 | European Pat. Off. . |
| 0210308 | 2/1987 | European Pat. Off. . |
| 0212782 | 3/1987 | European Pat. Off. . |
| 0250706 | 1/1988 | European Pat. Off. . |
| 56-125622 | 10/1981 | Japan . |
| 61-283827 | 12/1986 | Japan . |
| 61-283828 | 12/1986 | Japan . |
| WO85/05677 | 12/1985 | WIPO . |
| WO86/00699 | 1/1986 | WIPO . |
| WO87/02469 | 4/1987 | WIPO . |

OTHER PUBLICATIONS

K-Flow Mass Flow Meters 1986.
Langdon, I. Phys. E: Sci. Instrum, vol. 18 1985.
Plache, Coriolis/Gyroscopic Flow Meter, 1–7. Aug. 1978.
Katys, Continuous Measurement of Unsteady Flow, 45–53, 1964.
Decker, The Engineers Digest, 21:92–93, 1960.
Wildhack, Science 120:191–197, 1954.
Grant, Bopp & Reuther, 1986.

*Primary Examiner*—Richard Chilcot
*Assistant Examiner*—Harshad Patel
*Attorney, Agent, or Firm*—Fish & Richardson P.C.

[57] ABSTRACT

The invention features a manifold that includes two cylindrical ports and a cavity that connects to a fluid line. The ports both have the same cross-sectional area, and the center axes of the ports are oriented at the same angle with respect to the axis of the cavity. The ports couple to the cavity through separate transition regions, one of the transition regions coupling to a region at one end of the cavity that is circular in cross-section, and the other transition region coupling to an aperture disposed in a wall of the cavity. Both transition regions provide continuous fluid flow paths to the respective ports.

17 Claims, 5 Drawing Sheets

U.S. PATENT DOCUMENTS

| | | |
|---|---|---|
| 4,127,028 | 11/1978 | Cox et al. |
| 4,170,128 | 10/1979 | Kratky et al. |
| 4,187,721 | 2/1980 | Smith |
| 4,192,184 | 3/1980 | Cox et al. |
| 4,252,028 | 2/1981 | Smith et al. |
| 4,299,553 | 11/1981 | Swaroop |
| 4,311,054 | 1/1982 | Cox et al. |
| 4,360,750 | 11/1982 | Pohl |
| 4,381,680 | 5/1983 | Shiota |
| 4,422,338 | 12/1983 | Smith |
| 4,444,059 | 4/1984 | Smith |
| 4,470,294 | 9/1984 | Hamel |
| 4,491,009 | 1/1985 | Ruesch |
| 4,491,025 | 1/1985 | Smith et al. |
| 4,559,833 | 12/1985 | Sipin |
| 4,622,858 | 11/1986 | Mizerak |
| 4,628,744 | 12/1986 | Lew |
| 4,655,089 | 4/1987 | Kappelt et al. |
| 4,658,657 | 4/1987 | Kuppers |
| 4,660,421 | 4/1987 | Dahlin et al. |
| 4,680,974 | 7/1987 | Simonsen et al. |
| 4,691,578 | 9/1987 | Herzl |
| 4,703,660 | 11/1987 | Brenneman |
| 4,716,771 | 1/1988 | Kane |
| 4,733,569 | 3/1988 | Kelsey et al. |
| 4,747,312 | 5/1988 | Herzl |
| 4,756,197 | 7/1988 | Herzl |
| 4,756,198 | 7/1988 | Levien |
| 4,759,223 | 7/1988 | Frost |
| 4,763,530 | 8/1988 | Mizerak |
| 4,768,384 | 9/1988 | Flecken et al. |
| 4,768,385 | 9/1988 | Cage et al. |
| 4,777,833 | 10/1988 | Carpenter |
| 4,781,068 | 11/1988 | Pradelli |
| 4,781,069 | 11/1988 | Mitzner |
| 4,782,700 | 11/1988 | Hulsing |
| 4,782,711 | 11/1988 | Pratt |
| 4,784,000 | 11/1988 | Gaertner |
| 4,784,001 | 11/1988 | Gaertner |
| 4,793,191 | 12/1988 | Flecken et al. |
| 4,793,192 | 12/1988 | Jerger et al. |
| 4,798,091 | 1/1989 | Lew |
| 4,811,602 | 3/1989 | Hulsing |
| 4,811,606 | 3/1989 | Hasegawa et al. |
| 4,817,448 | 4/1989 | Hargarten et al. |
| 4,823,592 | 4/1989 | Hahn |
| 4,823,613 | 4/1989 | Cage et al. |
| 4,823,614 | 4/1989 | Dahlin |
| 4,825,705 | 5/1989 | Hohloch et al. |
| 4,829,832 | 5/1989 | Lew |
| 4,831,885 | 5/1989 | Dahlin |
| 4,843,890 | 7/1989 | Samson et al. |
| 4,852,410 | 8/1989 | Corwon et al. |
| 4,856,346 | 8/1989 | Kane |
| 4,864,861 | 9/1989 | Hulsing |
| 4,876,879 | 10/1989 | Ruesch |
| 4,876,898 | 10/1989 | Cage et al. |
| 4,891,991 | 1/1990 | Mattar et al. |
| 4,911,020 | 3/1990 | Thompson |
| 4,973,228 | 11/1990 | Althaus et al. |
| 5,048,350 | 9/1991 | Hussain et al. |
| 5,054,326 | 10/1991 | Mattar |
| 5,073,208 | 12/1991 | Wong et al. |
| 5,095,761 | 3/1992 | Nortz et al. |
| 5,115,683 | 5/1992 | Pratt |
| 5,129,263 | 7/1992 | Chi |
| 5,154,583 | 10/1992 | Althaus et al. |
| 5,230,254 | 7/1993 | Craft |
| 5,275,061 | 1/1994 | Young et al. |
| 5,343,764 | 9/1994 | Mattar et al. |

PARALLEL-FLOW CORIOLIS-TYPE MASS FLOWMETER WITH FLOW-DIVIDING MANIFOLD

BACKGROUND OF THE INVENTION

The invention relates to manifolds for use in, for example, Coriolis-type mass flowmeters.

In response to the need to measure the quantity of material being delivered through pipelines, numerous types of flowmeters have evolved from a variety of design principles. One of the more widely used types of flowmeters is based on volumetric flow. However, under non-ideal conditions, such as where the density of the material varies with fluid temperature, where the fluid being pumped through the pipeline is polyphase (such as a slurry), or where the fluid is non-Newtonian (such as mayonnaise or other food products), volumetric flowmeters are at best inaccurate in determining the total mass or mass flow rate of material delivered. In addition, the metered delivery of liquid components for chemical reactions, and other systems in which relative mass proportions of two or more fluids are critical, may be poorly served by volumetric flowmeters.

A mass flowmeter, on the other hand, is an instrument that provides a direct indication of the mass flow rate, as opposed to volume flow rate, of material being transferred through the pipeline. Direct measurement of mass in a moving stream requires applying a force to the stream and detecting and measuring some consequence of the resulting acceleration.

One class of mass measuring flowmeters is based on the well-known Coriolis effect. Examples of Coriolis-type mass flowmeters are described in U.S. Pat. No. 4,891,991 to Mattar et al., entitled "Coriolis-Type Mass Flowmeter," issued on Jan. 9, 1990, U.S. Pat. No. 4,911,020 to Thompson, entitled "Coriolis-Type Mass Flowmeter Circuitry," issued on Mar. 27, 1990, U.S. Pat. No. 5,048,350 to Hussain et al., entitled "Electromagnetic Driver and Sensor," issued on Sep. 17, 1991 and U.S. Pat. No. 5,054,326 to Mattar, entitled "Density Compensator for Coriolis-Type Mass Flowmeters," issued on Oct. 8, 1991, all assigned to the assignee of the present invention and incorporated herein by reference in their entirety.

Many Coriolis-type mass flowmeters induce a Coriolis force by oscillating the pipe sinusoidally about a pivot axis orthogonal to the length of the pipe. In such a mass flowmeter, Coriolis forces are exhibited in the radial movement of mass in a rotating conduit. Material flowing through the pipe becomes a radially travelling mass that, therefore, experiences an acceleration. The Coriolis reaction force experienced by the travelling mass is transferred to the pipe and is manifested as a deflection or offset of the pipe in the direction of the Coriolis force vector in the plane of rotation.

A major difficulty in these oscillatory systems is that the Coriolis force, and therefore the resulting deflection, is relatively small compared not only to the drive force, but also to extraneous vibrations. On the other hand, an oscillatory system can employ the inherent bending resiliency of the pipe as a hinge or pivot point for oscillation. This obviates the need for separate rotary or flexible joints, and thereby improves mechanical reliability and durability. Moreover, in an oscillatory system the resonant frequency of vibration of the pipe or conduit can be used as the drive frequency of the system, reducing the amount of energy needed to oscillate the conduit.

The susceptibility of an oscillatory system to external vibration can be lessened by delivering the flow stream through a pair of parallel conduit tube loops rigidly supported by the same flowmeter manifold block. As fluid flows through the two conduit tube loops, they are oscillated sinusoidally, generally 180° out of phase with respect to each other, about pivot axes orthogonal to the length of the conduits. Because they are supported by the same rigid structure, the two parallel loops form a tuning fork assembly. The motion of the two loops tends to cancel out at the block, and the inertia of the block tends to isolate the loops from extraneous vibration. The dynamics of the parallel tube tuning fork assembly also reduce the amount of energy needed to drive the system, and help to reduce further the effects of extraneous vibration.

For a dual-tube Coriolis-type mass flowmeter to operate properly, the two tubes must be precisely balanced with respect to one another. Maintaining that balance depends in large measure on the flow rates through the tubes being equal, or nearly so. For example, if the fluid velocities in the tubes are unequal, the tube containing the higher velocity fluid will erode at a faster rate than the tube containing the lower velocity fluid, upsetting the balance of the system. Additionally, certain "coating" fluids will coat the inner surface of the high-velocity flow tube less than the inner surface of the low-velocity flow tube. This effect can also disturb the balance between the two tubes. Further, polyphase fluids may tend to separate as they flow through the tubes, the degree of separation being a function of the flow velocity. Thus, a polyphase fluid passing through the high-velocity flow tube can separate to a different degree than the same fluid passing through the low-velocity flow tube, which can also result in tube imbalance.

To ensure that the flow rates through the two parallel tubes remain equal, many dual-tube flowmeters connect the two tubes in series, such that the entirety of the measured fluid passes first through one tube, and then through the other. In a serial flow system, however, the diameters of the two tubes generally equal the diameter of the pipeline to which the flowmeter connects. This can be problematic, as typically larger-diameter tubes must also be longer, often considerably so, to provide the desired system dynamics. This makes the entire flowmeter larger and more difficult to package.

Alternatively, in a parallel flow system, a splitter divides fluid entering the flowmeter into two nearly equal flow streams, which are then provided to the two flowmeter tubes. A typical splitter for a parallel flow system can damage delicate fluids, such as milk products or blood. Moreover, splitters are subject to erosion, which can affect the ratio into which the flow streams are split, and often produce undesirable pressure drops and increased fluid flow velocities.

SUMMARY OF THE INVENTION

One aspect of the invention features a first manifold that includes a cavity of generally uniform cross-section disposed along an axis and in communication with a fluid line. The center axes of a pair of first and second ports are oriented at substantially the same angle with respect to the axis of this cavity. The smooth, continuous centerline of a first transition region disposed between the first port and an end of the cavity is substantially tangent to the axis of the cavity and to the center axis of the first port. The smooth, continuous centerline of a second transition region disposed between the second port and an aperture disposed in a wall of the cavity is substantially tangent to the center axis of the second port.

Among other advantages, the manifold can be designed to provide a low pressure drop between an inlet of the manifold and the first port that nearly equals the pressure drop between the inlet and the second port. The invention may therefore be used to divide fluid supplied to the cavity from the fluid line into separate flow streams having nearly the same volume flow rate. Moreover, this division may be accomplished without exposing the fluid to significant shear stress. Thus, sensitive, delicate fluids, such as milk products, blood, and the like, are less likely to be damaged as they are divided by the manifold.

In one exemplary embodiment of the invention, the center axes of the first and second ports are parallel to one another and perpendicular to the axis of the cavity, which is curved. The ports are equidistant from the axis of the cavity, and the cross-sectional area of the cavity approximately equals the sum of the cross-sectional areas of the ports. Moreover, the first centerline is a quarter-circle segment, and the second centerline has a constant radius. The first and second transition regions have circular cross-sections, the diameters of which vary linearly along their respective centerlines.

Another exemplary embodiment of the invention includes a second manifold substantially identical to the first manifold. A first continuous loop of conduit is rigidly mounted for fluidic interconnection at a first end to the first port of the first manifold, and at a second end to the second port of the second manifold. A second continuous loop of conduit is rigidly mounted for fluidic interconnection at a first end to the second port of the first manifold, and at a second end to the first port of the second manifold.

Among other advantages, the volume flow rates through the two conduit loops are nearly identical. This is particularly difficult since the fluid flow direction is turned 90 degrees in the preferred embodiment. The impact of erosion, coating, separation, and/or other flow-related phenomena should be about the same for each loop, keeping the loops balanced. Further, for a given through-flow rate, the inner diameter of the loop tubing can be less than would be necessary if the loops were connected in series. As a result, shorter loops may be used. This reduces the physical size of the flowmeter. This embodiment of the invention is also bidirectional: Fluid can pass through the flowmeter in either direction, with no sacrifice in performance.

Other advantages and features of the invention will be apparent from the following description of a preferred embodiment, and from the claims.

DESCRIPTION OF THE PREFERRED EMBODIMENT(S)

MECHANICAL DESIGN

In the specific flowmeter configuration described herein, the conduit loops are perpendicularly orientated with respect to the direction of the process flow, i.e., the direction of flow in a straight section of pipeline through which the material to be measured passes. The flowmeter may be used with a variety of products including, for example, petroleum-based fuels, milk-based food products, and medical fluids such as blood. Certain aspects of the flowmeter may be applicable to flowmeters for similar or different applications.

Figure 1:
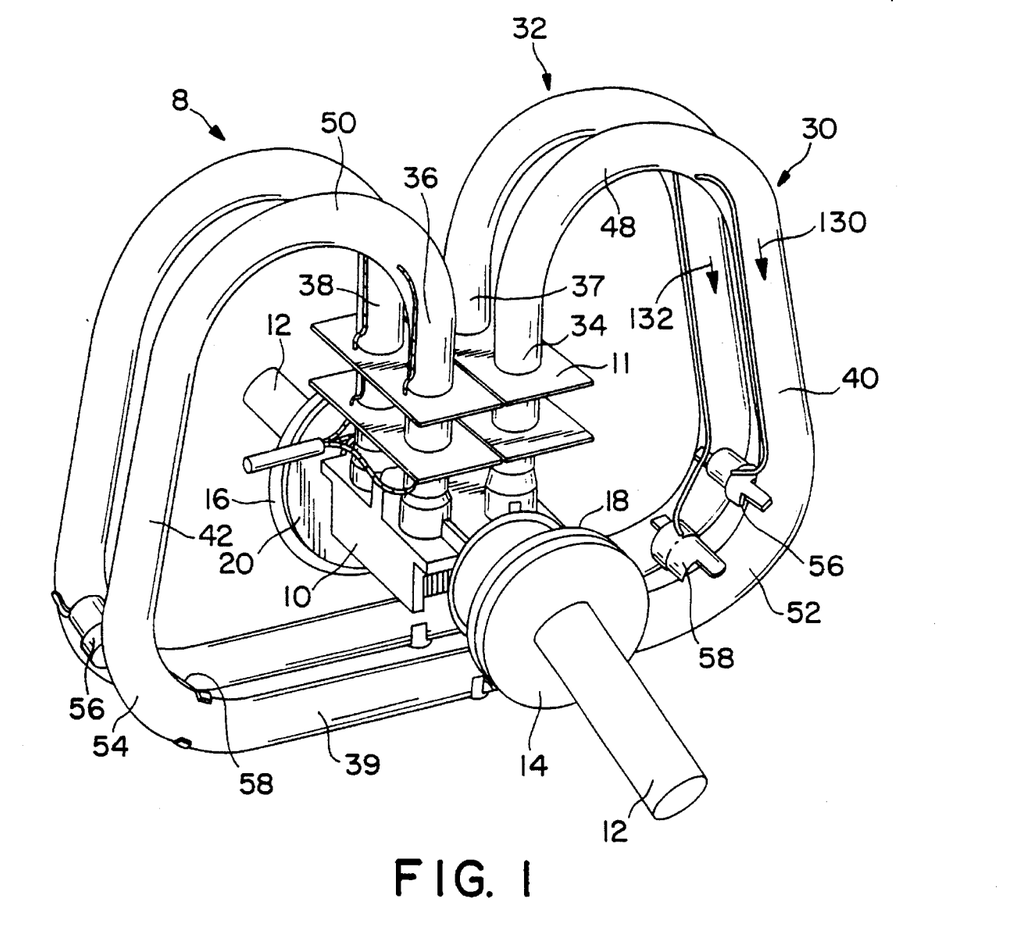
FIG. 1 is a perspective view of a Coriolis-type mass flowmeter employing a manifold in accordance with the present invention.
Figure 2:
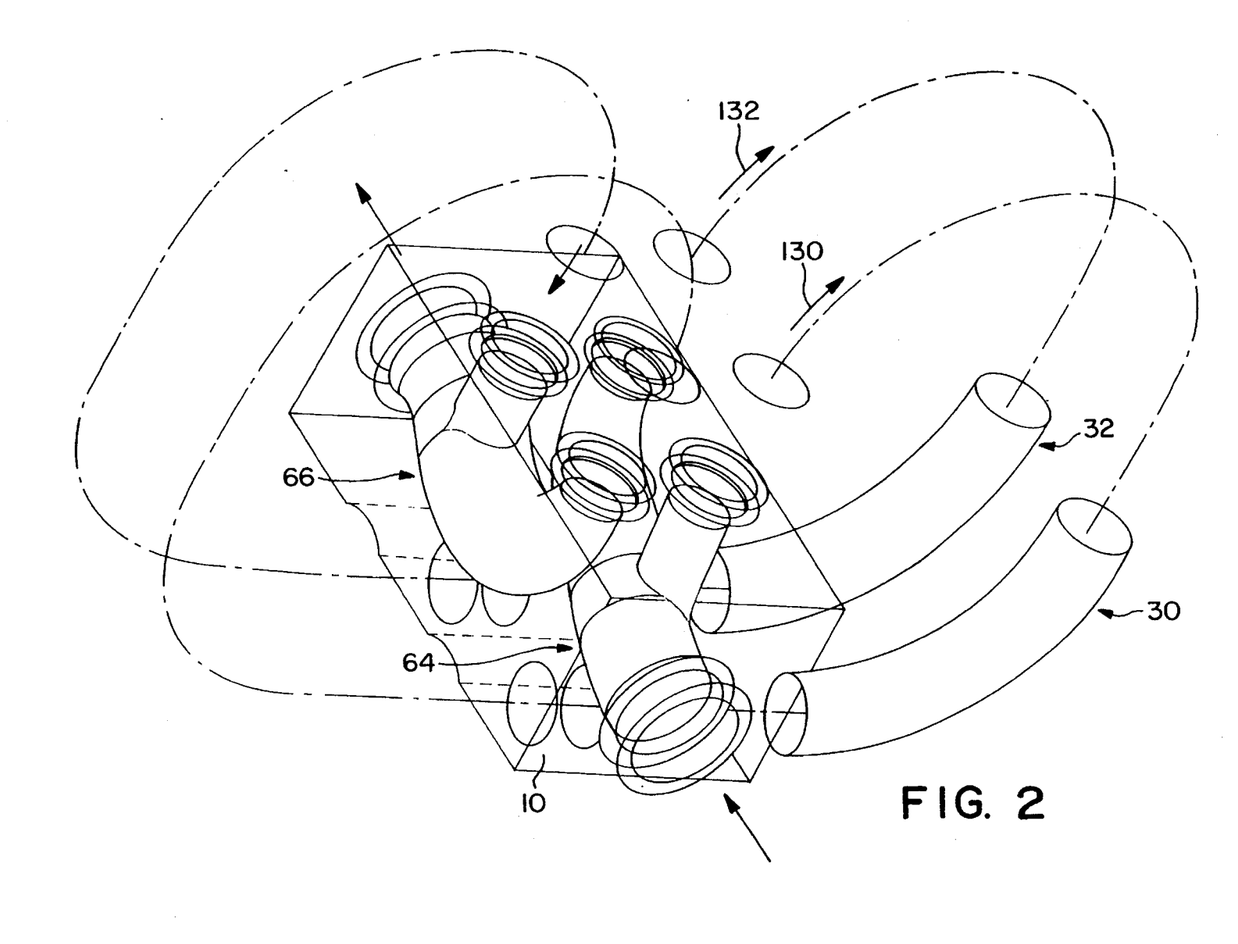
FIG. 2 is a phantom perspective view created by a computer-aided design system of the manifold block of the Coriolis-type mass flowmeter of FIG. 1.

FIGS. 1 and 2 illustrate a double conduit loop, dual drive/sensor Coriolis-type mass flowmeter system 8 with mainly torsional loading of the conduit ends where they rigidly connect to a manifold block 10 through node plates 11. Mass flowmeter 8 is designed to be inserted in a pipeline 12 that has had a small section removed or reserved to make room for the meter. Pipeline 12 is provided with opposing spaced flanges 14, 16, which sealably mate with mounting flanges 18, 20 welded to short pipe sections (not shown) protruding from opposite ends of manifold block 10.

Manifold block 10 also supports a pair of parallel planar conduit loops 30, 32. Conduit loops 30, 32 are essentially identical, and, unless otherwise indicated, the description of loop 30 is true also for loop 32. The ends of loop 30 comprise straight, preferably vertical, parallel inlet and outlet legs 34, 36 securely affixed, e.g., by butt welding, to the top of manifold block 10 in close proximity to one another. The ends of loop 32 likewise comprise straight, preferably vertical, parallel inlet and outlet legs, 37, 38, also securely affixed, in close proximity, to manifold block 10. The interconnection of legs 34, 36, 37, 38 of conduit loops 30, 32 with manifold block 10 is discussed in further detail below. The lower portion of loop 30 is a long straight section 39 passing beneath the bottom of manifold block 10. Section 39 is connected to upright legs 34, 36 by diagonal sections 40, 42. The four junctions between the various straight sections 34, 36, 39, 40, 42 of loop 30 are rounded by large radii turns so as to afford little resistance to flow through loop 30 In particular, upright legs 34, 36 are connected to the respective diagonal sections 40, 42 by means of apex turns 48, 50, and the ends of long straight base section 39 are connected to the ends of the diagonal segments 40, 42 by lower rounded turns 52, 54. In alternative designs the diagonals and turns merge to form more fully rounded lobes interconnecting section 39 with the legs.

Referring to FIG. 1, electromechanical driver 56 and sensor 58 assemblies are attached adjacent to the two lower rounded turns of each of loop conduits 30 and 32. Each assembly consists of an electromagnetic driver that oscillates the associated conduit, and a sensor that monitors the resulting deflection at the end of the straight section. Apparatus and circuitry for driving the oscillators and determining mass flow rate from the resulting deflection signals are described in detail in the references incorporated herein.

Figure 3:
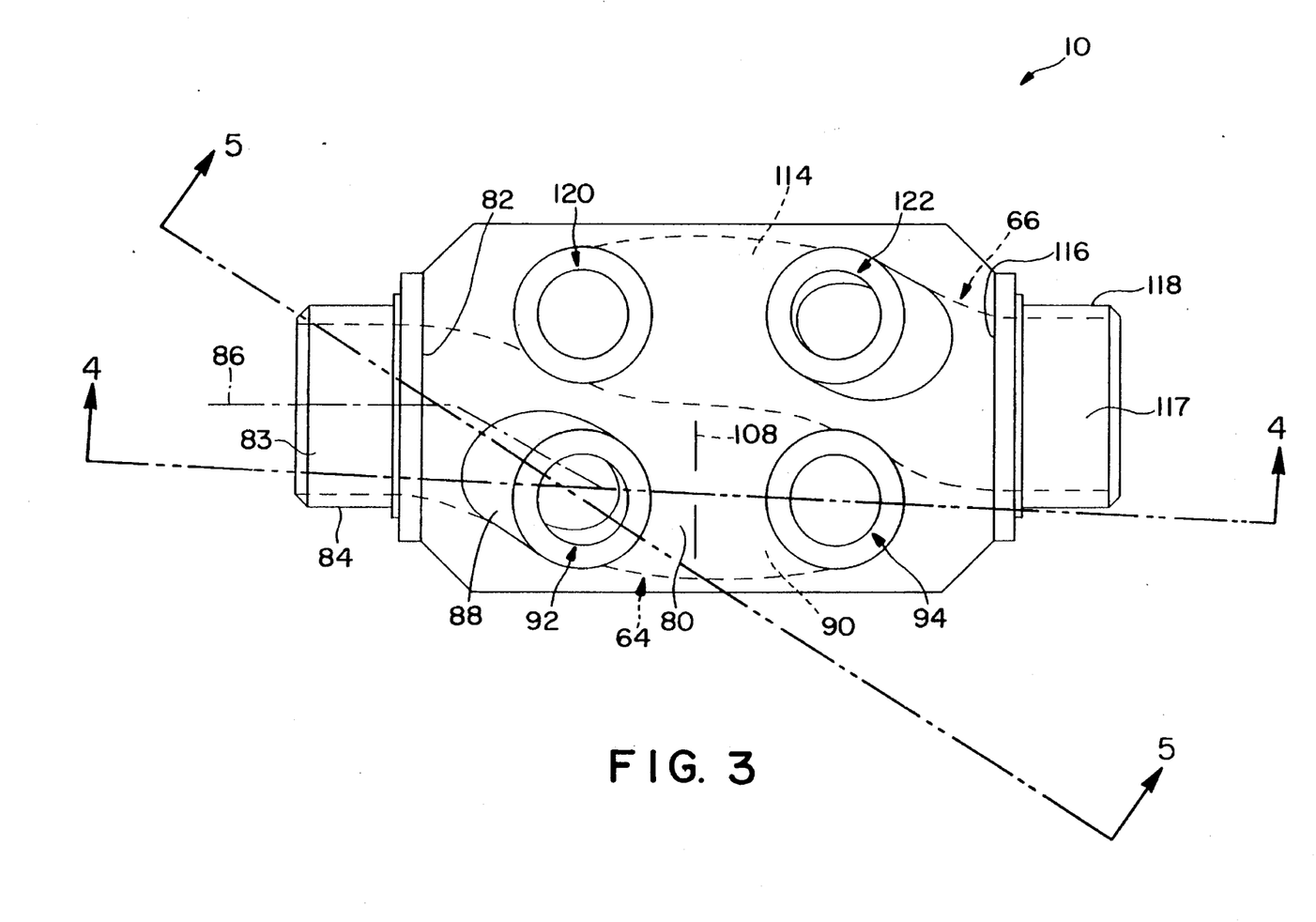
FIG. 3 is a top view of the manifold block of FIGS. 1–2.
Figure 4:
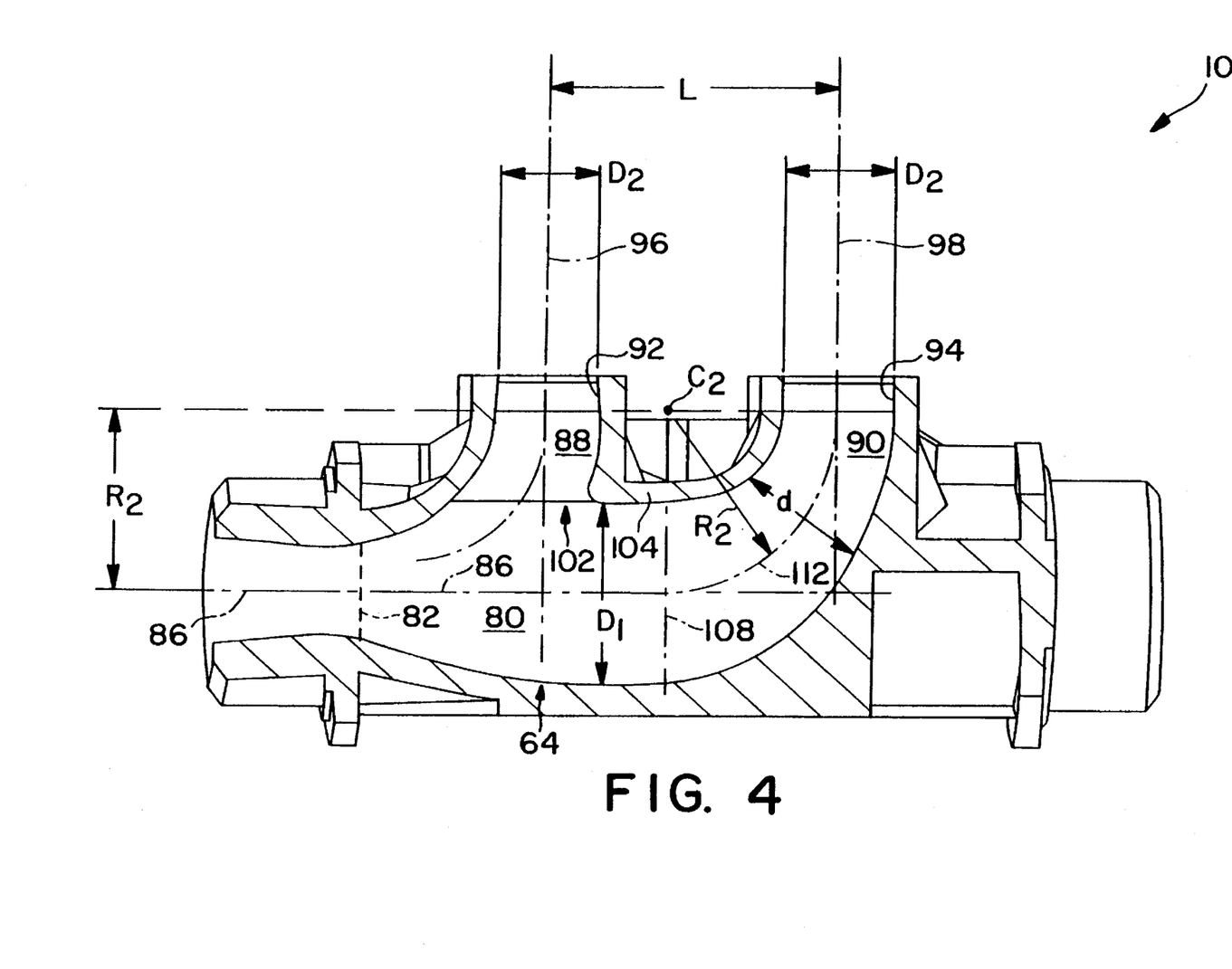
FIG. 4 is a sectional view of the manifold block of FIG. 3 taken along lines 4—4.
Figure 5:
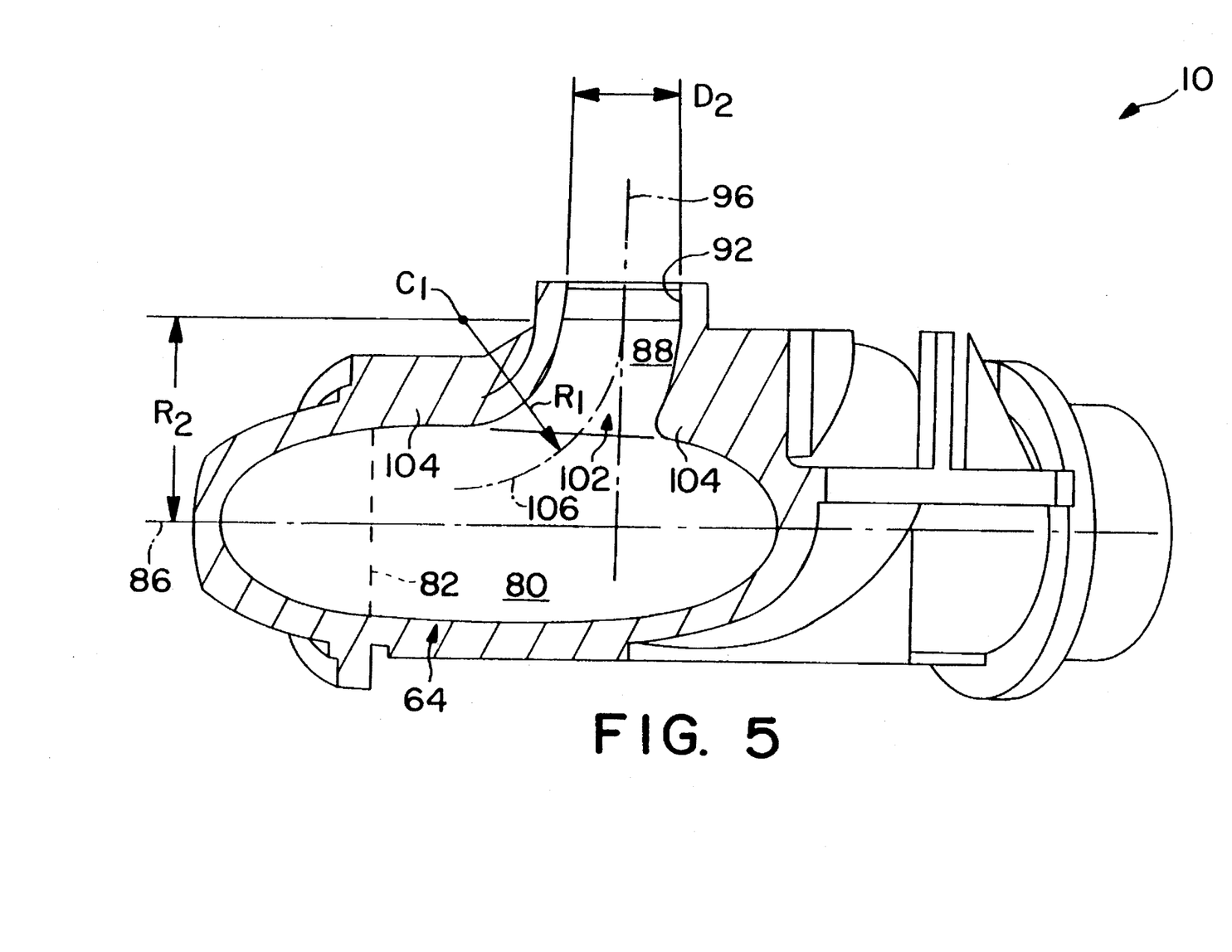
FIG. 5 is a sectional view of the manifold block of FIG. 3 taken along lines 5—5.

The details of manifold block 10 are illustrated in FIGS. 2–5. Manifold block 10 includes first and second dual-port manifolds 64, 66 (only manifold 64 is shown in FIGS. 4 and 5). Because manifolds 64, 66 are essentially identical, although oppositely oriented, unless otherwise indicated, the description of manifold 64 is true also for manifold 66.

A cavity 80 in manifold 64 has a uniform circular cross-section of constant diameter $D_1$. Diameter $D_1$ is selected in accordance with the flow area of pipeline 12. For example, if manifold 64 is to accommodate the flow through a 3 inch (outer diameter) pipeline, $D_1$ may be 2.82 inches (7.16 cm). A first end 82 of cavity 80 is in fluid communication with the flow passage 83 of a flange fitting 84 integrally cast onto one end of manifold 64. Flange 84 is sized to receive the short pipe section that carries mounting flange 18 (FIG. 1).

Although it has a uniform circular cross-section, cavity 80 is curved, and thus has a curved center axis 86. Because line 4—4 in FIG. 3 (along which the sectional view of FIG. 4 is taken) is straight and axis 86 is curved, line 4—4 and axis 86 are not coaxial along the entire length of cavity 80. Thus, while cavity 80 has a circular cross-section of constant diameter, FIG. 4 shows the walls of cavity 80 converging in the region of first end 82. As can be seen in FIG. 3, this is due to the fact that in this region the flat section or cutting plane indicated by line 4—4 comes close to the wall of cavity 80, whereas in other regions it is at or near the center of the cavity.

As shown in FIGS. 4 and 5, first and second curved transition regions 88, 90 channel fluid flowing into the first end 82 of cavity 80 to respective first and second ports 92, 94. Ports 92, 94, which are short cylindrical sections of diameter $D_2$, are located the same radial distance $R_2$ from the axis 86 of cavity 80. Further, center axes 96, 98 of ports 92, 94 are perpendicular to axis 86 of cavity 80, and parallel to one another (separated along axis 86 by a distance L). Thus, fluid rotates 90° as it flows through first and second transition regions 88, 90. Generally, diameter $D_2$ is chosen in accordance with diameter $D_1$ to provide, among other things, the desired flow rate through conduit loops 30, 32. The smaller $D_2$ becomes, the greater the acceleration of the fluid passing through transition regions 88, 90. For example, $D_2$ may be 1.743 in. (4.427 cm.).

First transition region 88 provides a smooth, continuous flow path between an aperture 102 in a wall 104 of cavity 80 and first port 92. In particular, the centerline 106 of first transition region 88 is a substantially constant radius $R_1$ segment, centered at point $C_1$, that is tangent to axis 96 of first port 92. Like port 92, $C_1$ is located a distance $R_2$ from axis 86. The radial cross-section of first transition region 88 (i.e., the cross-section taken perpendicular to centerline 106) is, at every point along centerline 106, a circle of substantially constant diameter $D_2$ (i.e., the diameter of ports 92, 94).

As shown in FIG. 4, second transition region 90 provides a smooth, continuous flow path between a second end 108 of cavity 80 (which is at a right angle to axis 86) and second port 94. The centerline 112 of second transition region 90 is a quarter-circle segment, centered at point $C_2$, of substantially constant radius $R_2$. Centerline 112 is tangent to both axis 86 of cavity 80 and axis 98 of second port 94. Center $C_2$ lies directly above second end 108, a distance $R_2$ from axes 86, 98.

The radial cross-section of second transition region 90 is a circle of diameter d at every point along centerline 112. Where second transition region 90 meets second end 108 of cavity 80, d equals $D_1$, the diameter of cavity 80. Where second transition region 90 meets first port 94, d equals $D_2$, the diameter of second port 94. Because $D_1$ is generally larger than $D_2$, the velocity through second transition region 90 increases as the fluid flows toward second port 94. At port 94, the fluid velocity is essentially the same as the fluid velocity at port 92 (which substantially equals the flow velocity throughout first transition region 88). Except in manifolds where $D_1$ equals $D_2$, diameter d varies, in a linear fashion, along centerline 112. Because the length of centerline 112 is $\pi R_2/2$, d can be expressed as:

$$d(q) = D_1 - q\frac{2(D_1 - D_2)}{\pi R_2}$$

where q is the distance along centerline 112 from the second end 108 of cavity 80.

Thus, where second transition region 90 meets the second end 108 of cavity 80, the slope of second transition region 90 equals the slope of the immediately adjacent portion of cavity 80. The slope then changes continuously until second transition region 90 meets second port 94, where the slope equals the slope of the immediately adjacent portion of second port 94.

Parameters L, $R_1$, and $R_2$ are selected to provide the desired flow properties through manifold 64. Typically, these parameters are chosen in accordance with diameters $D_1$ and $D_2$ so that the pressure drop between first end 82 and first port 92 is both low and nearly equal to the pressure drop between first end 82 and second port 94. (Small differences in pressure drop are acceptable. As explained below, first port 92 couples to a second port of manifold 66, and second port 94 couples to a first port of manifold 66. Thus, a small difference in pressure drop in manifold 64 should be largely cancelled out by and equal difference in pressure drop in manifold 66.) Accordingly, manifold 64 divides fluid supplied to cavity 80 into two nearly equal (flow rate) streams at ports 92, 94. The parameters are also typically chosen to provide smooth flow paths that reduce the shear stress on the fluid as it is divided by manifold 64.

The selection of radius $R_2$ of centerline 112 of second transition region 90 is largely governed by two general criteria. First, radius $R_2$ should not be made so small that fluid separates from the tight-radius portion of transition region 90 (i.e., the portion of transition region nearest center $C_2$) as it flows through manifold 64. Fluid separation results in turbulence and other phenomena that can increase the pressure drop across transition region 90. Nor should radius $R_2$ be made so large that shear stresses at the fluid-transition region interface result in an unacceptably large pressure drop across transition region 90. Although to some degree radius $R_1$ is selected in accordance with radius $R_2$ to provide the desired flow properties, radius $R_1$ is likewise largely bounded by the same pressure drop considerations that factor into the selection of radius $R_2$. For example, radius $R_1$ may be 2.32 inches (5.89 cm), and radius $R_2$ may be 2.90 inches (7.36 cm). Generally, $R_1$ will be less than $R_2$.

Distance L is usually selected to provide adequate separation of conduit loops 30, 32, which connect to first and second ports 92, 94 of manifold 64, 66. Other space or packing considerations may militate in favor of increasing or decreasing L. Distance L should also be chosen in accordance with radius $R_2$. In particular, in order that first transition region 88 does not intersect with second transition region 90, L should be large enough with respect to $R_2$ that the second end 108 of cavity 80 is downstream of aperture 102. This is accomplished if L is greater than about $R_2 + \frac{1}{2} D_2$. As was the case with $R_2$, increasing distance L increases also the pressure drop between first end 82 and second port 94. Thus, L should not be increased so large that this pressure drop becomes unacceptably large. For example, L may be 4.50 inches (11.43 cm).

As explained above, manifold 66 (FIGS. 2 and 3) is essentially identical to manifold 64, but oriented in the opposite direction. A first end 116 of a cavity 114 of manifold 66 is in fluid communication with the flow passage 117 of a flange fitting 118 integrally cast onto the end of manifold 64 opposite flange fitting 84. Flange 118 is sized to receive the short pipe section that carries mounting flange 20 (FIG. 1). Upright leg section 34 of conduit loop 30 couples to first port 94 of manifold 64, and upright leg section 36 of conduit loop 30 couples to second port 120 of manifold 66. Similarly, upright leg section 37 of conduit loop 32 couples to second port 94 of manifold 64, and upright leg section 38 of conduit loop 32 couples to first port 122 of manifold 66.

Operation

In operation, fluid supplied by the short pipe section attached to mounting flange 18 enters cavity 80 of manifold 64 of manifold block 10 through the flow passage 83 of flange fitting 84. (Fluid flow directions are indicated by arrows in FIGS. 1 and 2.) The fluid stream is divided in manifold 64 by first and second transition regions 88, 90 into two flow streams 130, 132 having approximately equal volume flow rates. At least in part because of the smooth, continuous characters of the fluid flow paths defined by first and second transition regions 88, 90, the fluid experiences little shear stress as it passes through manifold 64. Thus, sensitive fluids, such as milk products, blood, etc., are less likely to be damaged as they are divided.

After exiting first transition region 88, flow stream 130 passes sequentially through segment 34, apex turn 48, diagonal segment 40, lower rounded turn 52, straight base section 39, lower rounded turn 54, diagonal segment 42, apex turn 50, and segment 36. Flow stream 130 then exits into the second port 120 of manifold 66. Flow stream 132 takes a similar path through conduit loop 32 before exiting through first port 122 into manifold 66. Streams 130 and 132 are recombined in cavity 114, and the recombined stream exits manifold block 10 by passing through the flow passage 117 of flange fitting 118 and into the short pipe section attached to mounting flange 20.

Coriolis flow meter 8 is also bidirectional. Thus, fluid may be supplied to manifold block 10 through the short pipe section attached to mounting flange 20. The short pipe section attached to mounting section 18 then serves as the fluid outlet. Operation in this manner is identical to that described above, except the flow directions of streams 130 and 132 are reversed.

Other embodiments are within the claims.

For example, cavity 80 and transition regions 88, 90 could have non-circular cross-sections. Ports 92, 94 could have different diameters. Center axes 96, 98 of first and second ports 92, 94 need not be parallel to one another, nor must they be perpendicular to axis 86. Thus, axes 96, 98 might lie at the same, non-90° angle with respect to axis 86 without being parallel to one another.

Moreover, while the manifold block of the Coriolis-type mass flowmeter described herein includes two interconnected manifolds, each manifold could also be used alone, and not necessarily in mass flowmeter applications, to divide fluid flow streams. When a manifold is used alone, if an equal flow division is desired it is helpful if the impedances (i.e., the resistance to flow) at the first and second ports are approximately equal. If they are not, it may be possible to adjust parameters L, $R_1$, and $R_2$ to attain the desired flow division.

Similarly, although the manifolds described and shown herein include only two ports, a manifold could have greater than two ports, each port having a corresponding transition regions. The additional transition region or regions could be configured and oriented similarly to the first transition region described above, with a substantially constant-radius centerline.

What is claimed is:

1. Apparatus comprising:
    a first manifold for connection with a fluid line, said first manifold comprising:
        a cavity of generally uniform cross-section disposed along an axis, said cavity being in sealed fluidic communication with said fluid line;
        first and second ports each having a center axis oriented at substantially the same angle with respect to said axis of said cavity;
        a first transition region disposed along a smooth, continuous first centerline between said first port and an end of said cavity, said first centerline being substantially tangent to said axis of said cavity and to said center axis of said first port; and
        a second transition region disposed along a smooth, continuous second centerline between said second port and an aperture disposed in a wall of said cavity, said second centerline being substantially tangent to said center axis of said second port.

2. The apparatus of claim 1 wherein said first centerline has a constant radius.

3. The apparatus of claim 2 wherein said first centerline is a quarter-circle segment.

4. The apparatus of claim 1 wherein said first transition region has a circular cross-section along said first centerline.

5. The apparatus of claim 4 wherein a diameter of said first transition region varies linearly along said first centerline.

6. The apparatus of claim 1 wherein said second centerline has a constant radius.

7. The apparatus of claim 6 wherein said second transition region has a circular cross-section along said second centerline.

8. The apparatus of claim 1 wherein a cross-sectional area of said first port substantially equals a cross-sectional area of said second port.

9. The apparatus of claim 8 wherein a cross-sectional area of said cavity approximately equals the sum of said cross-sectional areas of said first port and said second port.

10. The apparatus of claim 1 wherein said center axes of said first port and said second port are perpendicular to said axis of said cavity.

11. The apparatus of claim 1 wherein said center axis of said first port is parallel to said center axis of said second port.

12. The apparatus of claim 1 wherein said first port and said second port are substantially equidistant from said axis of said cavity.

13. The apparatus of claim 1 wherein said axis of said cavity is curved.

14. The apparatus of claim 1 further comprising a second manifold substantially identical to said first manifold.

15. The apparatus of claim 14 further comprising:
    a first continuous loop of conduit rigidly mounted for fluidic interconnection at a first end to said first port of said first manifold, and at a second end to said second port of said second manifold; and
    a second continuous loop of conduit rigidly mounted for fluidic interconnection at a first end to said second port of said first manifold, and at a second end to said first port of said second manifold.

16. Apparatus for a Coriolis-type mass flowmeter, said apparatus comprising:
    first and second manifolds, each comprising:
        a cavity of generally uniform cross-section disposed along an axis, said cavity being in sealed fluidic communication with a fluid line;

first and second ports each having a center axis oriented at substantially the same angle with respect to said axis of said cavity;

a first transition region disposed along a smooth, continuous first centerline between said first port and an end of said cavity, said first centerline being substantially tangent to said axis of said cavity and to said center axis of said first port; and a second transition region disposed along a smooth, continuous second centerline between said second port and an aperture disposed in a wall of said cavity, said second centerline being substantially tangent to said center axis of said second port.

17. The apparatus of claim 16 further comprising:

a first continuous loop of conduit rigidly mounted for fluidic interconnection at a first end to said first port of said first manifold, and at a second end to said second port of said second manifold; and a second continuous loop of conduit rigidly mounted for fluidic interconnection at a first end to said second port of said first manifold, and at a second end to said first port of said second manifold.

\* \* \* \* \*